UNITED STATES PATENT OFFICE.

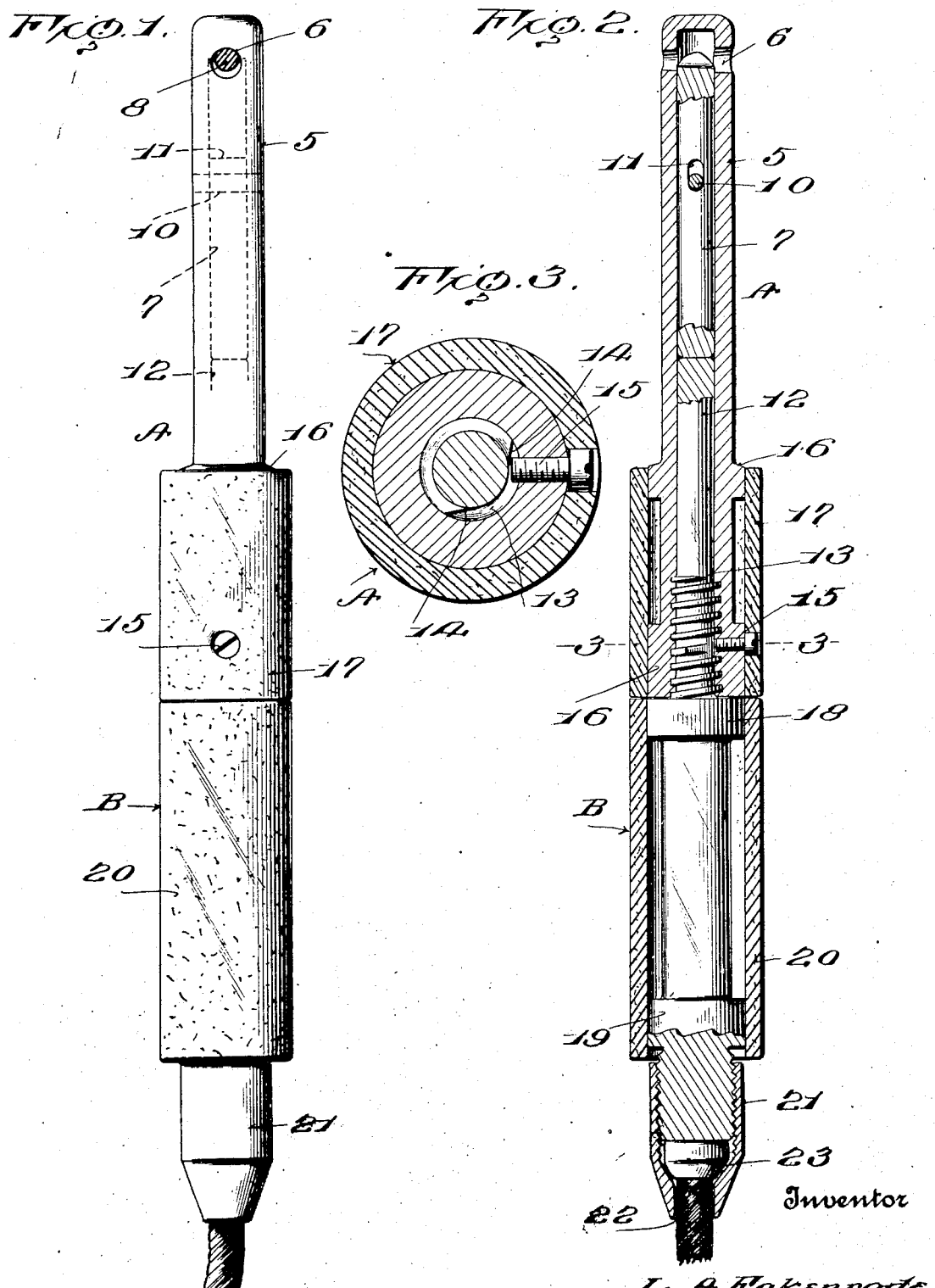

LOUIS A. ECKENRODE, OF CHAMBERSBURG, PENNSYLVANIA.

ELECTRODE-HOLDER.

1,329,384.  Specification of Letters Patent.  Patented Feb. 3, 1920.

Application filed April 25, 1919. Serial No. 292,610.

*To all whom it may concern:*

Be it known that I, LOUIS A. ECKENRODE, a citizen of the United States, residing at Chambersburg, in the county of Franklin, State of Pennsylvania, have invented certain new and useful Improvements in Electrode-Holders; and I do hereby declare the following to be a full, clear, and exact description of the invention, such as will enable others skilled in the art to which it appertains to make and use the same.

This invention relates to holders for electrodes employed in the art of electric welding and in the practice of the specific welding process in which the parts to be united are both placed upon a positive electrode, the negative electrode being passed in such close relation to them as to sustain the arc while the electrode is fused so that it may become a component part of the resultant jointure.

The object of the present invention is to provide a construction that will tightly grip and firmly hold the electrode and yet may be easily and instantly adjusted to both its gripping and releasing positions. A further object of the invention is to provide a structure in which there will be no spring or other member subject to deterioration from the working temperature of the holder and also to insure close union of the several conductive elements so as to avoid fusion and current losses. Other objects and advantages will be apparent from the following description.

In the drawings:—

Figure 1 is a side elevation showing a holder embodying the present invention.

Fig. 2 is a central section taken longitudinally through the structure.

Fig. 3 is a transverse section on line 3—3 of Fig. 2 in the plane of the stop screw that limits rotation of the handle sections with respect to each other and illustrating the interrupted thread with which the stop-screw coöperates.

Referring to the drawings, the present holder comprises two major members A and B of which the former consists of a cylinder 5 formed preferably of brass or copper, so as to be not only highly conductive, but also to prevent it from sticking to the work during treatment of such metals as are commonly welded and that do not alloy readily with copper or brass. The cylinder 5 has a central longitudinal bore extending through one end and adjacent to the other end which is closed. Formed transversely through the closed end portion of the cylinder 5 and communicating with its bore, is a tapered passage 6 that forms a socket in which is received one end of the wire that constitutes the electrode to be employed and fused in the welding operation.

Within the inner end portion of the bore of the cylinder 5 is fitted a reciprocatory plunger 7, one end of which is recessed to correspond to the curvature of the tapered passage 6 and the electrode 8 that is engaged in it so that when the plunger is advanced toward the electrode, it will engage and clamp the latter between its concaved end face and the opposite portion of the cylinder 5. In this connection it will be noted that the bore of the cylinder extends slightly beyond the passage so that the latter presents in effect, spaced jaws that are at opposite sides of the plunger. Rearward movement of the plunger is limited by a pin 10 passed diametrically through the cylinder 5 and through the slot 11 that is formed diametrically through the plunger and has also extension longitudinally of it sufficient to permit of movement of the plunger into and out of its clamping position.

To force and hold the plunger in clamping position, the member B is provided and consists of a rod, preferably of brass, one end portion of which is of a diameter to slidably fit the bore of the cylinder 5, as shown at 12. Inwardly of the portion 12, the rod is increased in diameter and threaded as shown at 13 to engage the correspondingly threaded outer end portion of the cylinder bore. When the rod is screwed into the cylinder it engages and operates the plunger and when unscrewed, it releases the plunger.

It is desired that when the plunger is released, the rod be not excessively retracted but that it move only sufficiently far to accomplish the purpose. For this reason, the thread 13 is interrupted, as shown at 14 and between the resultant shoulders is disposed the inner end of a screw 15 that is engaged through the corresponding point of the cylinder 5 when the rod has been screwed inwardly to effect the described clamping action. Engagement of the screw by the shoulders alternately, limits the rotation of the member B with respect to the member A.

At the base or open end of the cylinder are formed the longitudinally spaced circumscribing flanges 16, upon which is pressed the insulating tubular sheath 17 that forms one section of the handle of the article, the air chamber between the flanges serving to reduce the weight of the holder, with a saving of material.

At the base of the thread 13 of the rod is a circumscribing flange 18 and spaced from the end of the rod opposite to the portion 12, is a second circumscribing flange 19 and upon these two flanges is received a second tubular insulating sheath or sleeve 20 that abuts the sheath or sleeve 17 when the electrode is gripped and coöperates therewith to form a handle. It will of course be understood that the handle sections need not actually contact, so as to permit of the gripping of the electrode, whatever may be its diameter, within the limits of adjustment of the clamping faces.

To connect with the holder a conductor from a source of electricity, the end of the rod beyond the flanges 16, is threaded and provided with a threaded cap 21 through the outer end of which is formed a reduced passage 22 through which the feed wire or cable is passed, the end of the feed wire or cable being fused to form a head 23 that prevents withdrawal through the passage 22 and which is clamped by the cap against the end face of the rod.

With the construction described, it will be understood that by "backing up" the member B with respect to the member A, the plunger is released and permits of engagement of the electrode in the socket. A slight forward turn of the member B with respect to the member A then serves to advance the plunger into engagement with the electrode and clamp the latter against the spaced wall portions of the socket. Reverse operation effects release of the electrode.

What is claimed is:

1. An electrode holder comprising a tubular conductor having an electrode socket formed transversely therethrough and communicating with its bore, a plunger slidably mounted within the tubular member for movement of one end into and out of the socket, a conductive rod adjustably mounted in the tubular member for movement into and out of position to engage and actuate the plunger, means for limiting adjustment of the rod, handle members carried by the tubular member and the rod and means for connecting the conductor with the rod.

2. An electrode holder comprising a tubular conductor having an electrode-receiving socket formed transversely therethrough and communicating with its bore, a plunger slidably mounted in the bore of the tubular member and movable therein into and out of position to intersect the socket, means for limiting movement of the plunger, the outer end portion of the bore of the tubular member being threaded, a rod disposed within the tubular member in position to actuate the plunger in one direction when advanced in the tubular member, a conductive rod having a thread engaged with that of the tubular member for advancing the rod upon rotation thereof in the tubular member, the thread of the rod being interrupted, a stop member carried by the tubular member and engaged in the interruption of the thread of the rod, insulating handle members carried by the tubular member and the rod and means for connecting the conductor to the rod.

In testimony whereof, I affix my signature, in the presence of two witnesses.

LOUIS A. ECKENRODE.

Witnesses:
JOHN L. ETCHBERGER,
JNO. B. DIEHL.